US008576691B2

United States Patent
Fang et al.

(10) Patent No.: US 8,576,691 B2
(45) Date of Patent: *Nov. 5, 2013

(54) METHOD AND APPARATUS FOR CROSSTALK CHANNEL ESTIMATION

(71) Applicant: Huawei Technologies Co., Ltd., Guangdong (CN)

(72) Inventors: Liming Fang, Santa Clara, CA (US); Raphael Cendrillon, Hong Kong (CN)

(73) Assignee: Huawei Technologies Co., Ltd. (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/719,761

(22) Filed: Dec. 19, 2012

(65) Prior Publication Data

US 2013/0108026 A1     May 2, 2013

Related U.S. Application Data

(63) Continuation of application No. 12/551,664, filed on Sep. 1, 2009, which is a continuation of application No. PCT/CN2009/070517, filed on Feb. 24, 2009, application No. 13/719,761, which is a continuation of application No. 13/648,843, filed on Oct. 10, 2012.

(30) Foreign Application Priority Data

Feb. 28, 2008    (CN) .......................... 2008 1 0065734

(51) Int. Cl.
*H04J 1/12*     (2006.01)
(52) U.S. Cl.
USPC ............ 370/201; 370/266; 375/222; 375/227
(58) Field of Classification Search
USPC .......... 370/201; 375/222, 227, 246, 267, 296; 704/500; 379/419
See application file for complete search history.

(56) References Cited

U.S. PATENT DOCUMENTS 5,694,421 A * 12/1997 Park ............................. 375/227
6,580,752 B1   6/2003 Amrany (Continued)

FOREIGN PATENT DOCUMENTS

| CN | 1813417 A | 8/2006 |
|---|---|---|
| CN | 101036318 A | 9/2007 |
| WO | 2006069488 A1 | 7/2006 |
| WO | 2008009853 A1 | 1/2008 |

OTHER PUBLICATIONS

Search report issued in corresponding Chinese application No. 200810065734.2, dated Oct. 17, 2011, and an English translation thereof, total 5 pages.

(Continued)

*Primary Examiner* — Michael Thier
*Assistant Examiner* — Vincelas Louis
(74) *Attorney, Agent, or Firm* — Huawei Technologies Co., Ltd.

(57) ABSTRACT

A method and apparatus for crosstalk channel estimation based on a measured signal-to-noise (SNR) of a loaded line. The method for channel estimation includes: loading, on a newly added line K, a combination of K-1 signals sent on lines 1 to K-1; obtaining a measured SNR of the line K loaded with the combination of the K-1 signals sent on the lines 1 to K-1; and calculating crosstalk channels of the line K according to K-1 coefficients of the K-1 signals sent on the lines 1 to K-1 and the measured SNR. Embodiments of the present invention may be used for relevant network communications systems such as xDSL systems.

26 Claims, 3 Drawing Sheets

(56) References Cited

U.S. PATENT DOCUMENTS

| | | | |
|---|---|---|---|
| 7,154,845 B1 * | 12/2006 | Barrass et al. | 370/201 |
| 7,756,714 B2 | 7/2010 | Iser | |
| 7,830,978 B2 * | 11/2010 | Guenach et al. | 375/296 |
| 7,843,990 B2 | 11/2010 | Kramer | |
| 2004/0047283 A1 | 3/2004 | Bonwick | |
| 2004/0213146 A1 | 10/2004 | Jones | |
| 2007/0004286 A1 | 1/2007 | Hobbel | |
| 2008/0031313 A1 | 2/2008 | Oksman | |
| 2008/0089433 A1 * | 4/2008 | Cho et al. | 375/267 |
| 2009/0003845 A1 * | 1/2009 | Kaneda | 398/210 |

OTHER PUBLICATIONS

Front page corresponding granted Chinese Patent No. 101521637 B (Application No. 200810065734.2), issued Jul. 18, 2012, 1 page only.

Search report issued in corresponding European application No. 09713664.2-2415,dated Jun. 4, 2010,total 5 pages.

Search report issued in corresponding European application No. 11189536.3-2415,dated Feb. 7, 2012,total 4 pages.

Search report and Written opinion issued in corresponding PCT application No. PCT/CN2009/070517,dated May 21, 2009,total 6 pages.

G.vector Editor,"G.vector: Draft text for Recommendation G.vector",Study Group 15,TD 267 (WP 1/15), Telecommunication Standardization Sector,Feb. 2008,total 14 pages.

Office action issued in corresponding U.S. Appl. No. 12/551,664,dated Jun. 1, 2011,total 42 pages.

Office action issued in corresponding U.S. Appl. No. 12/551,664,dated Mar. 22, 2013,total 45 pages.

Office action issued in corresponding U.S. Appl. No. 13/648,843,dated Mar. 26, 2013,total 43 pages.

* cited by examiner

US 8,576,691 B2

METHOD AND APPARATUS FOR CROSSTALK CHANNEL ESTIMATION

CROSS-REFERENCE TO RELATED APPLICATION

This application is a continuation of U.S. patent application Ser. No. 12/551,664, filed on Sep. 1, 2009, which is a continuation of International Application No. PCT/CN2009/070517, filed on Feb. 24, 2009. The International Application claims priority to Chinese Patent Application No. 200810065734.2, filed on Feb. 28, 2008. The aforementioned patent applications are hereby incorporated by reference in their entireties.

FIELD OF THE INVENTION

The present invention relates to network communications, and in particular, to a method and apparatus for crosstalk channel estimation.

BACKGROUND OF THE INVENTION

Digital Subscriber Line (DSL) is a data transmission technology using telephone twisted pairs as the transmission medium. xDSL is a combination of DSL technologies including High-speed Digital Subscriber Line (HDSL), Single-pair High-Speed Digital Subscriber Line (SHDSL), and Asymmetrical Digital Subscriber Line (ADSL). SHDSL is based on baseband transmission. Other xDSL technologies, which are based on passband transmission and use the Frequency-Division Multiplexing (FDM) technology, may coexist with Plain Old Telephone Service (POTS) in the same twisted pairs.

As higher and higher bands are used by xDSL based on passband transmission, the highband crosstalk has become a severe problem. FIG. 1 shows a method for solving the crosstalk between xDSL lines by using a Vectored Digital Subscriber Line (Vectored-DSL) technology in the prior art. In the downlink direction, x indicates signal vectors sent by N×1 coordinated transceiver devices such as a Digital Subscriber Line Access Multiplexer (DSLAM); y indicates signal vectors received by N×1 opposite devices such as a subscriber-side device; and n indicates N×1 noise vectors. The following channel transmission matrix indicates a shared channel:

$$H = \begin{bmatrix} h_{11} & h_{12} & \cdots & h_{1M} \\ h_{21} & h_{22} & \cdots & h_{2M} \\ \vdots & \vdots & \ddots & \vdots \\ h_{n1} & h_{N2} & \cdots & h_{NN} \end{bmatrix}$$

$h_{ij}(1 \le i \le N, 1 \le j \le N)$ indicates a crosstalk transfer function of pair j to pair i; $h_{ij}(1 \le i \le N)$ indicates the channel transfer function of pair i; and N indicates the number of pairs, that is, the number of subscribers. If a vector pre-encoder (represented by W) is used in a coordinated transceiver device, the signal vectors that an opposite device receives are calculated according to the following formula:

$$\tilde{y} = HWx + n$$

If the vector pre-encoder can make HW a diagonal matrix, for example, diag(H), the crosstalk may be cancelled. To cancel the crosstalk, channel estimation needs to be performed to obtain a channel transmission matrix.

While developing the present invention, the inventor found that signal errors are used to estimate channels in the prior art and devices are required to provide signal errors. Many devices running on a network, however, do not support this function. As a result, signal errors are not available for channel estimation and thus the crosstalk cannot be cancelled.

SUMMARY OF THE INVENTION

Embodiments of the present invention provide a method and apparatus for crosstalk channel estimation based on a measured signal-to-noise (SNR) of a loaded line.

One embodiment of the present invention provides a method for crosstalk channel estimation, including: loading, on a newly added line K, a combination of K-1 signals sent on lines 1 to K-1; obtaining a measured a signal-to-noise ratio (SNR) of the line K loaded with the combination of the K-1 signals sent on the lines 1 to K-1; and calculating crosstalk channels of the line K according to K-1 combination coefficients of the K-1 signals sent on the lines 1 to K-1 and the measured SNR.

Another embodiment of the present invention provides an apparatus comprising a transceiver configured to: load, on a newly added line K, a combination of K-1 signals sent on lines 1 to K-1; obtain a measured signal-to-noise ratio (SNR) of the line K loaded with the combination of the K-1 signals sent on the lines 1 to K-1; and calculate crosstalk channels of the line K according to K-1 combination coefficients of the K-1 signals sent on the lines 1 to K-1 and the measured SNR.

Yet another embodiment of the present invention provides a method for crosstalk channel estimation, comprising: receiving, at a transceiver corresponding to a newly added line K, a signal comprising a combination of K-1 signals sent on lines 1 to K-1; obtaining, at the transceiver, a signal-to-noise ratio (SNR) of the line K in response to the reception of the signal; and calculating, at the transceiver, crosstalk channels of the line K according to K-1 combination coefficients associated with the K-1 signals sent on the lines 1 to K-1 and the SNR.

A further embodiment of the present invention provides an apparatus comprising a transceiver configured to: receive, on a newly added line K, a signal comprising a combination of K-1 signals sent on lines 1 to K-1; obtain a signal-to-noise ratio (SNR) of the line K in response to the reception of the signal; and calculate crosstalk channels of the line K according to K-1 combination coefficients associated with the K-1 signals sent on the lines 1 to K-1 and the SNR.

The benefits of at least some embodiments of the present invention may include the following: no devices need to be redesigned (e.g., to provide signal errors); the measurement time is short; the precision is high; and the robustness is good.

DETAILED DESCRIPTION OF THE INVENTION

Embodiments of the present invention may be used to estimate crosstalk channels when new subscribers get online and may be further used to trace crosstalk channels. The following describes the present invention with an example of adding a new subscriber to a vector group. Suppose that there are K-1 lines in a vector group. When line K needs to be added to the vector group, the crosstalk between line K and other K-1 lines may be estimated respectively according to the SNR measured on line K.

Figure 1:
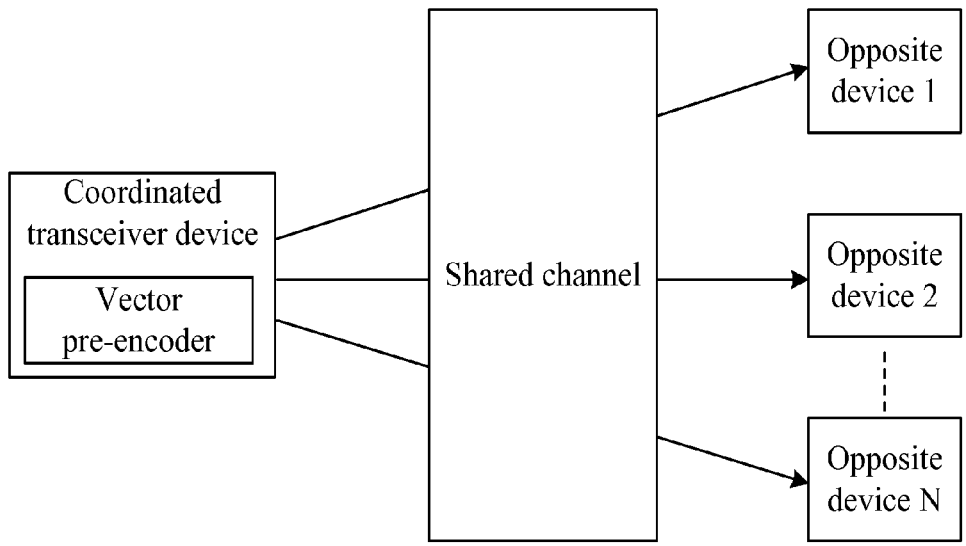
FIG. 1 shows a method for solving the crosstalk between xDSL lines by using a vectored-DSL technology in the prior art.
Figure 2:
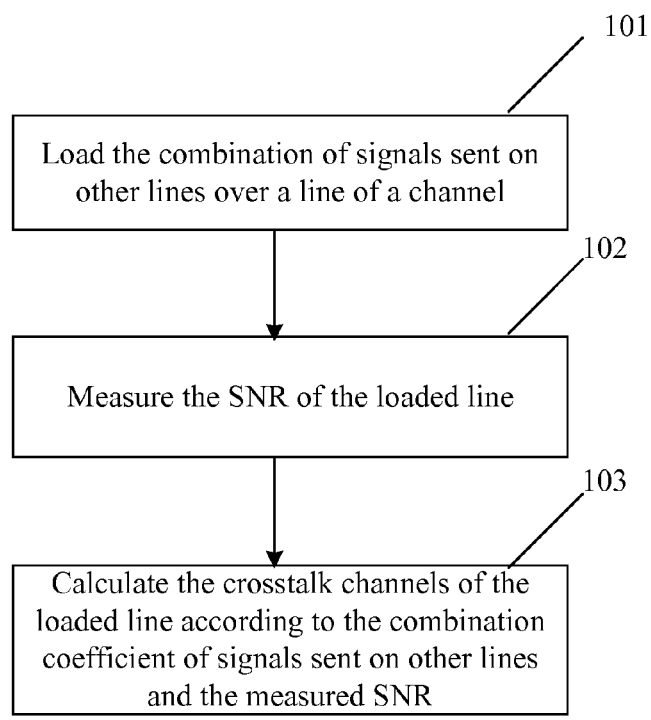
FIG. 2 shows a method for channel estimation in a first embodiment of the present invention.

FIG. 2 shows a method for channel estimation in a first embodiment of the present invention. The method includes the following steps:

Step 101: The combination of signals sent on other lines is loaded over a line of a channel.

In this step, the coordinated transceiver device loads the combination of all or part of signals sent on line 1 to line K-1 over a sub-band in the downlink direction of line K. In this way, the lines whose signals are loaded and the lines that cause crosstalk to line K may be estimated. Various sub-bands are processed concurrently.

The embodiment describes how to load the combination of all signals sent on line 1 to line K-1. Suppose that the SNR of line K needs to be measured for N times, each lasting L symbols, and that other K-1 lines already enter the show-time state. If the signal to be sent on line i at the $1^{th}$ symbol during SNR measurement n is $s_i^{(n)}(l)$, the signal actually sent on the line is $x_i^{(n)}(l)$. When line K is added to the vector group, other lines continue to send original signals. In this case, $$x_i^{(n)}(l) = s_i^{(n)}(l), \forall i < K.$$

After the combination of signals sent on line 1 to line K-1 are added to the signals sent on line K, the signals sent on line K may be calculated according to the following formula:

$$x_K^{(n)}(l) = s_K^{(n)}(l) + \varepsilon \sum_{i=1}^{K-1} z_i^{(n)} s_i^{(n)}(l).$$

where, $z_i^{(n)}$ indicates the combination coefficient of line i during SNR measurement n and meets the following condition:

$$\sum_{i=1}^{K-1} |z_i^{(n)}|^2 = 1.$$

In an exemplary embodiment, the quadratic sum of the absolute value of the combination coefficient is 1 but may be any other value.

$\varepsilon$ indicates a step, which is designed to avoid extra bit errors on line K due to the loaded signals. In this embodiment, the SNR tolerance at the receive end of line K must not be less than zero after the loaded signals are included. In general, the SNR tolerance of a line is 6 dB. For safety, the SNR at the receive end of line K after signal loading should not exceed 3.5 dB. In this embodiment, to meet the preceding requirements, $\varepsilon$ is set according to the following formula:

$$\varepsilon = \min_i \frac{1}{2} \frac{1}{\sqrt{SNR_K^{(0)}}} \frac{\sigma_K}{\sigma_i},$$

In the preceding formula, $\sigma_i^2$ indicates the transmit power of line i (the coordinated transceiver device has known the transmit power of each line) and $SNR_K^{(0)}$ indicates the SNR at the receive end of line K when no signals are loaded.

Step 102: The SNR of the loaded line is measured.

In this step, the opposite device measures the SNR of the same sub-band in the downlink direction of line K. The SNR is directly measured.

Step 3: Crosstalk channels of the loaded line are calculated according to the combination coefficient of signals sent on other lines and the measured SNR.

In this step, the coordinated transceiver device calculates the crosstalk channels of line K according to the returned SNR after line K is loaded from the opposite device and the combination coefficient of signals sent on other lines; or the coordinated transceiver device sends the combination coefficient of signals sent on other lines to the opposite device and the opposite device calculates the crosstalk channels of line K according to the measured SNR after line K is loaded and the received combination coefficient.

The deduction process of calculating the crosstalk channels of the loaded line is as follows:

According to the formula for calculating the signals sent after line K is loaded in step 101, the signals received by the opposite device of line K are as follows:

$$y_K^{(n)}(l) = \sum_{i=1}^{K} h_{K,i} x_i^{(n)}(l) + w_K^{(n)}(l)$$

$$= h_{K,K} s_K^{(n)}(l) + \sum_{i=1}^{K-1} (h_{K,i} + \varepsilon z_i^{(n)} h_{K,K}) s_i^{(n)}(l) + w_K^{(n)}(l)$$

The received signal power is as follows:

$$signal_K = \frac{1}{L} \sum_{l=1}^{L} |h_{K,K} s_K^{(n)}(l)|^2 \approx |h_{K,K}|^2 \sigma_K^2$$

The received noise power is as follows:

$$noise_K = \frac{1}{L} \sum_{l=1}^{L} |y_K^{(n)}(l) - h_{K,K} s_K^{(n)}(l)|^2$$

$$\approx \sum_{i=1}^{K-1} |h_{K,i} + \varepsilon z_i^{(n)} h_{K,K}|^2 \sigma_i^2 + \sigma_{W_K}^2,$$

where, $\sigma_{W_K}^2$ indicates the power of the background noise.

According to the preceding two formulas, when the transmit power of each line is the same, that is, $\sigma_i^2 = \sigma_K^2$, the SNR measured by the opposite device of line K may be represented by the following formula:

$$\frac{1}{SNR_K^{(n)}} = \frac{noise_K}{signal_K}$$

-continued $$\approx \frac{1}{\sigma_K^2}\left(\sum_{i=1}^{K-1}\left|\frac{h_{K,i}}{h_{K,K}}\sigma_i + \varepsilon z_i^{(n)}\sigma_i\right|^2 + \frac{\sigma_{w_K}^2}{|h_{K,K}|^2}\right)$$

$$= \sum_{i=1}^{K-1}\left|\frac{h_{K,i}}{h_{K,K}} + \varepsilon z_i^{(n)}\right|^2 + \frac{\sigma_{w_K}^2}{|h_{K,K}|^2 \sigma_K^2}$$

$$= \|\bar{a} + \varepsilon \bar{b}^{(n)}\|^2 + \frac{\sigma_{w_K}^2}{|h_{K,K}|^2 \sigma_K^2}$$

In the case of $\sigma_i^2 = \sigma_K^2$, the step is as follows:

$$\varepsilon = \min_i \frac{1}{2}\frac{1}{\sqrt{SNR_K^{(0)}}},$$

Supposing $$\bar{a} = [\bar{a}_1 \ldots \bar{a}_{K-1}]^T, \bar{b}^{(n)} = [\bar{b}_1^{(n)} \ldots \bar{b}_{K-1}^{(n)}]^T,$$

$$\bar{a}_i = \frac{h_{K,i}}{h_{K,K}}, \text{ and } \bar{b}_i^{(n)} = z_i^{(n)},$$

then according to the Pythagorean Proposition, $$\|\bar{a}+\varepsilon\bar{b}^{(n)}\|^2 = \|\bar{a}\|^2 + \|\varepsilon\bar{b}^{(n)}\|^2 + 2\varepsilon Re\{\bar{b}^{(n)H}\bar{a}\}$$

If $\bar{a}$ and $\bar{b}^{(n)}$ are decomposed into a real part and an imaginary part respectively, that is, $a_{R,i}=Re\{\bar{a}_i\}$, $a_{I,i}=Im\{\bar{a}_i\}$, $b_{R,i}^{(n)}=Re\{\bar{b}_i^{(n)}\}$, and $b_{I,i}^{(n)}=Im\{\bar{b}_i^{(n)}\}$, then $$Re\{\bar{b}^{(n)H}\bar{a}\} = \sum_{i=1}^{K-1}[a_{R,i}b_{R,i}^{(n)} + a_{I,i}b_{I,i}^{(n)}]$$

$$= b^{(n)H}a,$$

where, $a=[a_{R,1} \ldots a_{R,K-1} \, a_{I,1} \ldots a_{I,K-1}]^T$, and $b^{(n)}=[b_{R,1}^{(n)} \ldots b_{R,K-1}^{(n)} \, b_{I,1}^{(n)} \ldots b_{I,K-1}^{(n)}]^T$.

For convenience, suppose $a_i=[a]_i$ and $b_i^{(n)}=[b^{(n)}]_i$. According to $\|\bar{a}+\varepsilon\bar{b}^{(n)}\|^2=\|\bar{a}\|^2+\|\varepsilon\bar{b}^{(n)}\|^2+2\varepsilon Re\{\bar{b}^{(n)H}\bar{a}\}$ and $$Re\{\bar{b}^{(n)H}\bar{a}\} = \sum_{i=1}^{K-1}[a_{R,i}b_{R,i}^{(n)} + a_{I,i}b_{I,i}^{(n)}],$$

$$= b^{(n)H}a,$$

$$\|\bar{a}+\varepsilon\bar{b}^{(n)}\|^2 = \|\bar{a}\|^2 + \|\varepsilon\bar{b}^{(n)}\|^2 + 2\varepsilon b^{(n)H}a$$

According to the preceding formula and the SNR expression, $$\|\bar{a}\|^2 + \|\varepsilon\bar{b}^{(n)}\|^2 + 2\varepsilon b^{(n)H}a + \frac{\sigma_{w_K}^2}{|h_{K,K}|^2 \sigma_K^2} = \frac{1}{SNR_K^{(n)}}$$

Therefore, $$\varepsilon b^{(n)H}a + \frac{1}{2}\|\bar{a}\|^2 + \frac{1}{2}\frac{\sigma_{w_K}^2}{|h_{K,K}|^2 \sigma_K^2} = \frac{1}{2}\frac{1}{SNR_K^{(n)}} - \frac{1}{2}\|\varepsilon\bar{b}^{(n)}\|^2$$

Due to $\bar{b}_i^{(n)}=z_i^{(n)}$, $$\varepsilon b^{(n)H}a + \frac{1}{2}\|\bar{a}\|^2 + \frac{1}{2}\frac{\sigma_{w_K}^2}{|h_{K,K}|^2 \sigma_K^2} = \frac{1}{2}\frac{1}{SNR_K^{(n)}} - \frac{1}{2}\varepsilon^2 \sum_{i=1}^{K-1}|z_i^{(n)}|^2$$

Supposing $$c^{(n)} = \frac{1}{2}\frac{1}{SNR_K^{(n)}} - \frac{1}{2}\varepsilon^2 \sum_{i=1}^{K-1}|z_i^{(n)}|^2,$$

then $$\varepsilon b^{(n)H}a + \frac{1}{2}\|\bar{a}\|^2 + \frac{1}{2}\frac{\sigma_{w_K}^2}{|h_{K,K}|^2 \sigma_K^2} = c^{(n)}, \forall n$$

An M×N matrix P is defined, where $p_{m,n}=[P]_{m,n}$ meets the following condition:

$$\sum_{n=1}^{N} p_{m,n} = 0, \forall m$$

P is used as the combination matrix of the SNR. Then, $$\sum_n p_{m,n} c^{(n)} = \varepsilon \sum_n p_{m,n} b^{(n)H} a + \left(\frac{1}{2}\|\bar{a}\|^2 + \frac{1}{2}\frac{\sigma_{w_K}^2}{|h_{K,K}|^2 \sigma_K^2}\right)\sum_n p_{m,n}, \forall m$$

Due to $$\sum_{n=1}^{N} p_{m,n} = 0, \forall m,$$

$$\sum_n p_{m,n} c^{(n)} = \varepsilon \sum_n p_{m,n} b^{(n)H} a, \forall m$$

A formula in the preceding format is available for each n. Combine all these formulas into a matrix. Then, $$P\begin{bmatrix} c^{(1)} \\ \vdots \\ c^{(N)} \end{bmatrix} = \varepsilon P\begin{bmatrix} b^{(1)H} \\ \vdots \\ b^{(N)H} \end{bmatrix} a$$

Supposing $c=[c^{(1)} \ldots c^{(N)}]^T$ and $B=[b^{(1)} \ldots b^{(N)}]^H$, then $$\varepsilon PBa = Pc$$

According to the preceding formula, the least square solution of a is as follows:

$$a = \epsilon^{-1} \text{pinv}(PB)Pc,$$

where, pinv(.) indicates a pseudo-inverse operation.

After the value of a is obtained, the crosstalk channels normalized by direct channels may be obtained according to $$\bar{a}_i = \frac{h_{K,i}}{h_{K,K}}$$

and $a = [a_{R,1} \ldots a_{R,K-1} \ a_{I,1} \ldots a_{I,K-1}]^T$.

The obtained crosstalk channels are represented by the following formula:

$$\frac{h_{K,i}}{h_{K,K}} = a_i + j a_{K-1+i}$$

According to the preceding deduction, the specific steps of calculating crosstalk channels are: selecting a proper combination matrix and perform calculation according to G=pinv(PB)P and the combination coefficient of signals sent on each line; performing calculation according to $$c^{(n)} = \frac{1}{2}\frac{1}{SNR_K^{(n)}} - \frac{1}{2}\epsilon^2 \sum_{i=1}^{K-1} |z_i^{(n)}|^2,$$

the combination coefficient of signals sent on each line, and the measured SNR; performing calculation according to $a = \epsilon^{-1} Gc$ and the preceding calculation results; and calculating the crosstalk channels normalized by direct channels according to $$\frac{h_{K,i}}{h_{K,K}} = a_i + j a_{K-1+i}, \forall i.$$

When the transmit power of each line is different, the SNR measured by the opposite device of line K may be represented by the following formula:

$$\frac{1}{SNR_K^{(n)}} = \frac{\text{noise}_K}{\text{signal}_K}$$

$$\approx \frac{1}{\sigma_k^2}\left(\sum_{i=1}^{K-1}\left|\frac{h_{K,i}}{h_{K,K}}\sigma_i + \epsilon z_i^{(n)}\sigma_i\right|^2 + \frac{\sigma_{w_K}^2}{|h_{K,K}|^2}\right)$$

$$= \frac{1}{\sigma_k^2}\left(\|\bar{a}+\epsilon\bar{b}^{(n)}\|^2 + \frac{\sigma_{w_K}^2}{|h_{K,K}|^2}\right),$$

Supposing $$\bar{a} = [\bar{a}_1 \ldots \bar{a}_{K-1}]^T, \bar{b}^{(n)} = [\bar{b}_1^{(n)} \ldots \bar{b}_{K-1}^{(n)}]^T, \bar{a}_i \frac{h_{K,i}}{h_{K,K}}\sigma_i, \text{ and}$$

$$\bar{b}_i^{(n)} = z_i^{(n)}\sigma_i,$$

according to the Pythagorean Proposition, $$\|\bar{a}+\epsilon\bar{b}^{(n)}\|^2 = \|\bar{a}\|^2 + \|\epsilon\bar{b}^{(n)}\|^2 + 2\epsilon Re\{\bar{b}^{(n)H}\bar{a}\}$$

If $\bar{a}$ and $\bar{b}^{(n)}$ are decomposed into a real part and an imaginary part respectively, that is, $a_{R,i} = Re\{\bar{a}_i\}$, $a_{I,i} = Im\{\bar{a}_i\}$, $b_{R,i}^{(n)} = Re\{\bar{b}_i^{(n)}\}$, and $b_{I,j}^{(n)} = Im\{\bar{b}_i^{(n)}\}$, then $$Re\{\bar{b}^{(n)H}\bar{a}\} = \sum_{i=1}^{K-1}[a_{R,i}b_{R,i}^{(n)} + a_{I,i}b_{I,i}^{(n)}]$$

$$= b^{(n)H}a,$$

where, $a = [a_{R,1} \ldots a_{R,K-1} \ a_{I,1} \ldots a_{I,K-1}]^T$, and $b^{(n)} = [b_{R,1}^{(n)} \ldots b_{R,K-1}^{(n)} \ b_{I,1}^{(n)} \ldots b_{I,K-1}^{(n)}]^T$.

For convenience, suppose $a_i = [a]_i$ and $b_i^{(n)} = [b_i^{(n)}]_i$ . . . .

According to $\|\bar{a}+\epsilon\bar{b}^{(n)}\|^2 = \|\bar{a}\|^2 + \|\epsilon\bar{b}^{(n)}\|^2 + 2\epsilon Re\{\bar{b}^{(n)H}\bar{a}\}$ and $$Re\{\bar{b}^{(n)H}\bar{a}\} = \sum_{i=1}^{K-1}[a_{R,i}b_{R,i}^{(n)} + a_{I,i}b_{I,i}^{(n)}],$$

$$= b^{(n)H}a,$$

$$\|\bar{a}+\epsilon\bar{b}^{(n)}\|^2 = \|\bar{a}\|^2 + \|\epsilon\bar{b}^{(n)}\|^2 + 2\epsilon b^{(n)H}a$$

According to the preceding formula and the SNR expression, $$\|\bar{a}\|^2 + \|\epsilon\bar{b}^{(n)}\|^2 + 2\epsilon b^{(n)H}a + \frac{\sigma_{w_K}^2}{|h_{K,K}|^2} = \frac{\sigma_k^2}{SNR_K^{(n)}}$$

Therefore, $$\epsilon b^{(n)H}a + \frac{1}{2}\|\bar{a}\|^2 + \frac{1}{2}\frac{\sigma_{w_K}^2}{|h_{K,K}|^2} = \frac{1}{2}\frac{\sigma_k^2}{SNR_K^{(n)}} - \frac{1}{2}\|\epsilon\bar{b}^{(n)}\|^2$$

Due to $\bar{b}_i^{(n)} = z_i^{(n)}\sigma_i$, $$\epsilon b^{(n)H}a + \frac{1}{2}\|\bar{a}\|^2 + \frac{1}{2}\frac{\sigma_{w_K}^2}{|h_{K,K}|^2} = \frac{1}{2}\frac{\sigma_k^2}{SNR_K^{(n)}} - \frac{1}{2}\epsilon^2 \sum_{i=1}^{K-1}|z_i^{(n)}|^2 \sigma_i^2$$

Supposing $$c^{(n)} = \frac{1}{2}\frac{\sigma_k^2}{SNR_K^{(n)}} - \frac{1}{2}\epsilon^2 \sum_{i=1}^{K-1}|z_i^{(n)}|^2 \sigma_i^2,$$

then $$\epsilon b^{(n)H}a + \frac{1}{2}\|\bar{a}\|^2 + \frac{1}{2}\frac{\sigma_{w_K}^2}{|h_{K,K}|^2} = c^{(n)}, \forall n$$

An M×N matrix P is defined, where $p_{m,n}=[P]_{m,n}$ meets the following condition:

$$\sum_{n=1}^{N} p_{m,n} = 0, \forall m$$

P is used as the combination matrix of the SNR. Then $$\sum_n p_{m,n} c^{(n)} = \varepsilon \sum_n p_{m,n} b^{(n)H} a + \left(\frac{1}{2}\|\bar{a}\|^2 + \frac{1}{2}\frac{\sigma_{W_K}^2}{|h_{K,K}|^2}\right)\sum_n p_{m,n}, \forall m$$

Due to $$\sum_{n=1}^{N} p_{m,n} = 0, \forall m,$$

$$\sum_n p_{m,n} c^{(n)} = \varepsilon \sum_n p_{m,n} b^{(n)H} a, \forall m$$

A formula in the preceding format is available for each n. Combine all these formulas into a matrix. Then $$P\begin{bmatrix} c^{(1)} \\ \vdots \\ c^{(N)} \end{bmatrix} = \varepsilon P \begin{bmatrix} b^{(1)H} \\ \vdots \\ b^{(N)H} \end{bmatrix} a$$

Supposing $c=[c^{(1)} \ldots c^{(N)}]^T$ and $B=[b^{(1)} \ldots b^{(N)}]^H$, then $$\varepsilon PBa = Pc$$

According to the preceding formula, the least square solution of a is as follows:

$$a = \varepsilon^{-1}\text{pinv}(PB)Pc$$

where, pinv(.) indicates a pseudo-inverse operation.

After the value of a is obtained, the crosstalk channels normalized by direct channels may be obtained according to $$\bar{a}_i = \frac{h_{K,i}}{h_{K,K}}\sigma_i$$

and $a=[a_{R,1} \ldots a_{R,K-1}\ a_{I,1} \ldots a_{I,K-1}]^T$. The obtained crosstalk channels are represented by the following formula:

$$\frac{h_{K,i}}{h_{K,K}} = \frac{1}{\sigma_i}(a_i + ja_{K-1+i}),$$

According to the preceding deduction, the specific steps of calculating crosstalk channels are as follows: selecting a proper combination matrix and perform calculation according to G=pinv(PB)P, the transmit power of each line, and the combination coefficient of signals sent on each line; performing calculation according to $$c^{(n)} = \frac{1}{2}\frac{\sigma_K^2}{SNR_K^{(n)}} - \frac{1}{2}\varepsilon^2\sum_{i=1}^{K-1}|z_i^{(n)}|^2\sigma_i^2,$$

the transmit power of each line, the combination coefficient of signals sent on each line, and the measured SNR; performing calculation according to $a=\varepsilon^{-1}Gc$ and the preceding calculation results; and calculating the crosstalk channels normalized by direct channels according to $$\frac{h_{K,i}}{h_{K,K}} = (a_i + ja_{K-1+i})/\sigma_i, \forall i.$$

Matrixes P and B may be selected in advance so as to realize optimal performance in most cases. Particularly, the following selections are required:

The normalized coefficient of discrete cosine transform is defined as follows:

$$u_{n,m} = \begin{cases} \sqrt{\frac{2}{N}}\cos\left(\frac{\pi(n+0.5)m}{N}\right) & t>1, n>1, \\ \frac{1}{\sqrt{N}} & \text{otherwise} \end{cases}$$

The preceding coefficient is converted into a matrix and the direct current component is deleted from the first row. Then $$U = \begin{bmatrix} u_{2,1} & \cdots & u_{2,N} \\ \vdots & \ddots & \vdots \\ u_{2K-1,1} & \cdots & u_{2K-1,N} \end{bmatrix}$$

$U^H$ is selected as the probe signal matrix, that is, $B=U^H$. Thus, $\bar{B}=U_{row\ 1:K-1}^H + jU_{row\ K:2(K-1)}^H$. Suppose the combination matrix of the SNR is P=U. On the one hand, this matrix may ensure a minimum channel estimation error when the returned SNR is affected. On the other hand, this matrix may avoid calculating the pseudo-inversion of the product of matrixes P and B. In an algorithm, to reduce the operation complicity, matrix G may be directly obtained through matrix P, as shown in the following formula:

$$G = \text{pinv}(PB)P$$
$$= \text{pinv}(UU^H)P$$
$$= P$$

In addition, if the number of subscribers is 2 to the power of n, the Walsh-Hadamard sequence may be selected to generate matrix B. The Walsh-Hadamard sequence includes positive 1 and negative 1. Thus, multiplication operations during calculation may be replaced by simple addition and subtraction operations. For any matrix B that meets the requirements in the method, the channel matrix may be correctly calculated. The method is not limited to the preceding selection methods.

Different combination coefficients are used and steps 101 and 102 are repeated for at least 2K-1 times to calculate the crosstalk of other K-1 lines to line K. The times of repeating steps 101 and 102 depends on the number of other loaded lines, that is, the number of crosstalk channels to be measured.

The preceding process may be repeated for multiple times to continuously update crosstalk channels so as to improve the precision or trace lines.

In addition, according to the calculated crosstalk channels, a similar crosstalk cancellation and compensation filter may be designed, as shown in the following formula:

$$F = I_K - \text{offdiag}\left(\begin{bmatrix} \frac{h_{1,1}}{h_{1,1}} & \cdots & \frac{h_{1,K}}{h_{1,1}} \\ \vdots & \ddots & \vdots \\ \frac{h_{K,1}}{h_{K,K}} & \cdots & \frac{h_{K,K}}{h_{K,K}} \end{bmatrix}\right),$$

where, offdiag(X)=X−diag(X).

The method for channel estimation in this embodiment includes: calculating the crosstalk feature of a loaded line according to the measured SNR of the loaded line and the combination of signals sent on other loaded lines. Thus, in this embodiment, no devices need to be redesigned; the measurement time is short; the precision is high; and the robustness is good.

Figure 3:
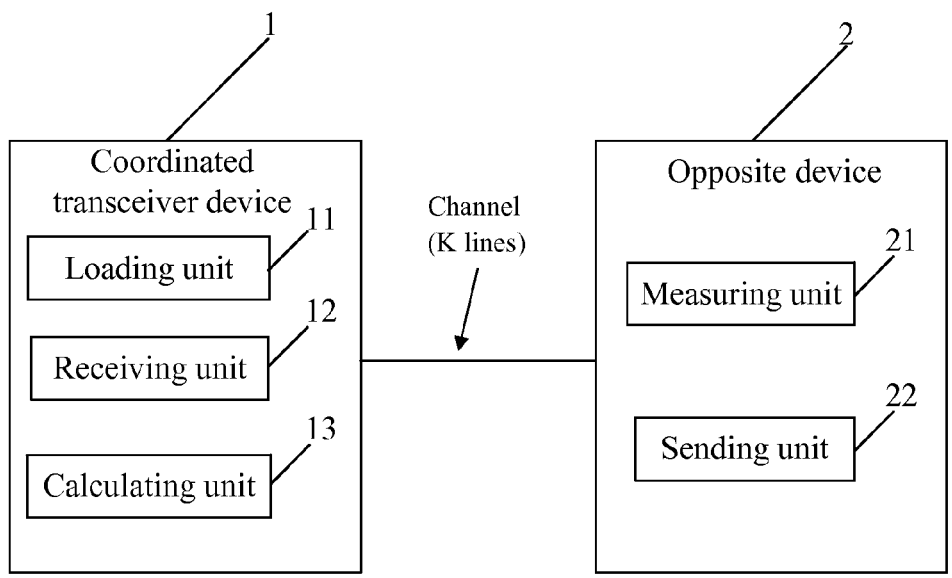
FIG. 3 shows a system for channel estimation in a second embodiment of the present invention.

FIG. 3 shows a system for channel estimation in a second embodiment of the present invention. The system includes at least a coordinated transceiver device 1 and an opposite device 2.

The coordinated transceiver device 1 includes a loading unit 11, a receiving unit 12, and a calculating unit 13. The loading unit 11 is configured to load a combination of signals sent on other lines over a line of a channel. The receiving unit 12 is configured to receive an SNR measured on the loaded line by an opposite device. The calculating unit 13 is configured to calculate crosstalk channels of the loaded line according to a combination coefficient of signals sent on other lines and the received SNR.

The opposite device 2 includes a measuring unit 21 and a sending unit 22. The measuring unit 21 is configured to measure the SNR of the loaded line. The sending unit 22 is configured to send the measured SNR to the coordinated transceiver device.

Figure 4:
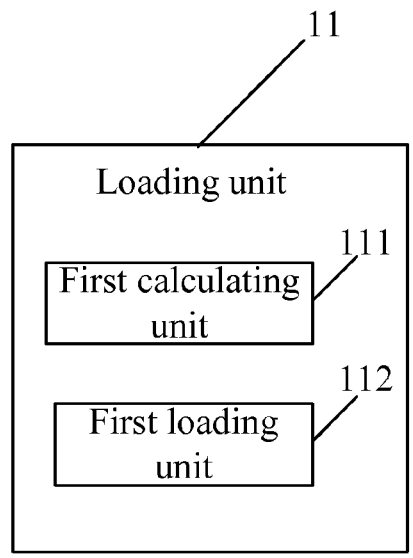
FIG. 4 shows a structure of a loading unit of a coordinated transceiver device in the second embodiment of the present invention.

FIG. 4 shows a structure of the loading unit of the coordinated transceiver device in this embodiment. The loading unit 11 of the coordinated transceiver device further includes a first calculating unit 111 and a first loading unit 112. The first calculating 111 is configured to calculate the product of the combination of signals sent on other lines and the step. The first loading unit 112 is configured to load the product of the combination of signals sent on other lines and the step over the loaded line.

The first calculating unit 111 may further include a second calculating unit 1111. The second calculating unit 1111 is configured to calculate the step according to the transmit power of each line and the SNR before the line is loaded.

The calculating unit 13 of the coordinated transceiver device in this embodiment is also configured to calculate crosstalk channels of the loaded line according to the step and the transmit power of each line.

The system and device for channel estimation in this embodiment calculate the crosstalk feature of a loaded line according to the measured SNR of the loaded line and the combination of signals sent on other loaded lines. Thus, in this embodiment, no devices need to be redesigned; the measurement time is short; the precision is high; and the robustness is good.

Figure 5:
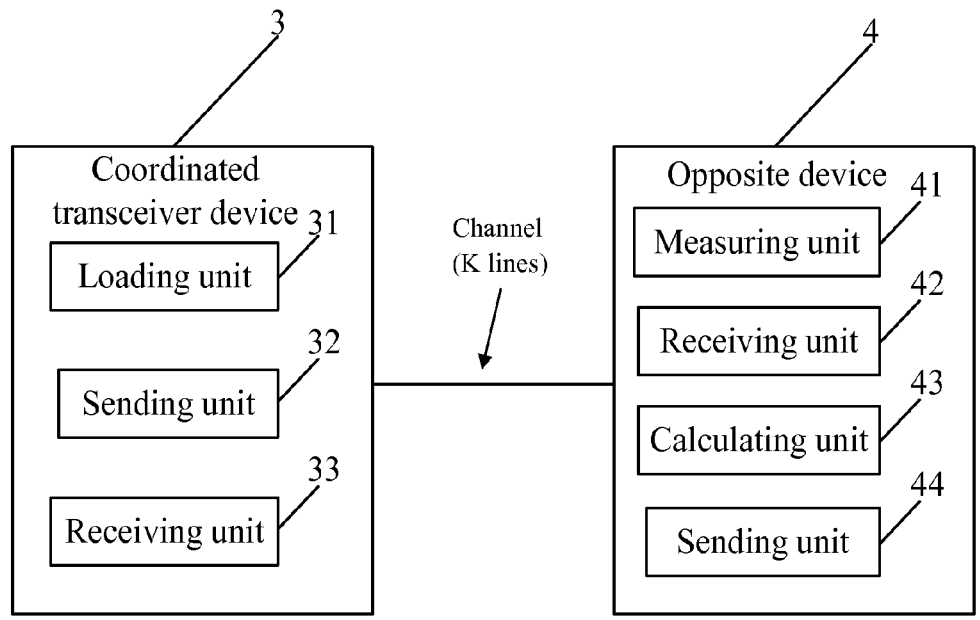
FIG. 5 shows a system for channel estimation in a third embodiment of the present invention.

FIG. 5 shows a system for channel estimation in a third embodiment of the present invention. The system includes at least a coordinated transceiver device 3 and an opposite device 4.

The coordinated transceiver device 3 includes a loading unit 31, a sending unit 32, and a receiving unit 33. The loading unit 31 is configured to load a combination of signals sent on other lines over a line of a channel. The sending unit 32 is configured to send a combination coefficient of signals sent on other lines to an opposite device. The receiving unit 33 is configured to receive crosstalk channels calculated for the loaded line by the opposite device.

The opposite device 4 includes a measuring unit 41, a receiving unit 42, a calculating unit 43, and a sending unit 44. The measuring unit 41 is configured to measure the SNR of the loaded line. The receiving unit 42 is configured to receive the combination coefficient of signals sent on other lines from the coordinated transceiver device. The calculating unit 43 is configured to calculate crosstalk channels of the loaded line according to the combination coefficient of signals sent on other lines and the measured SNR. The sending unit 44 is configured to send the calculated crosstalk channels to the coordinated transceiver device.

Figure 6:
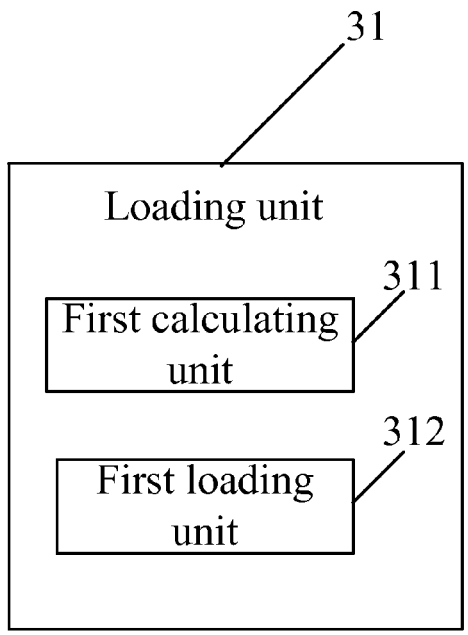
FIG. 6 shows a structure of the loading unit of the coordinated transceiver device in the third embodiment of the present invention.

FIG. 6 shows a structure of the loading unit of the coordinated transceiver device in this embodiment. The loading unit 31 of the coordinated transceiver device may further include a first calculating unit 311 and a first loading unit 312. The first calculating 311 is configured to calculate the product of the combination of signals sent on other lines and the step. The first loading unit 312 is configured to load the product of the combination of signals sent on other lines and the step over the loaded line.

The first calculating unit 311 may further include a second calculating unit 3111. The second calculating unit 3111 is configured to calculate the step according to the transmit power of each line and the SNR of the line before being loaded.

The sending unit 32 of the coordinated transceiver device 3 in this embodiment is also configured to send the step and the transmit power of each line to the opposite device.

Accordingly, in this embodiment, the receiving unit 42 of the opposite device 4 is also configured to receive the step and the transmit power of each line from the coordinated transceiver device; and the calculating unit 43 is also configured to calculate the crosstalk channels of the loaded line according to the received step and transmit power.

The system and device for channel estimation in this embodiment calculate the crosstalk feature of a loaded line according to the measured SNR of the loaded line and the combination of signals sent on other loaded lines. Thus, in this embodiment, no devices need to be redesigned; the measurement time is short; the precision is high; and the robustness is good.

Those skilled in the art may understand that all or part of the steps in the preceding embodiments may be implemented by hardware following instructions of a program. The program may be stored in a computer readable storage medium such as a read-only memory (ROM), a random access memory (RAM), a magnetic disk, or a compact disk.

The preceding embodiments are exemplary embodiments of the present invention only and not intended to limit the protection scope of the invention. It is apparent that various modifications and variations may be made to these embodiments without departing from the scope of the invention. The invention is intended to cover such modifications and variations provided that they fall in the scope of protection defined by the following claims.

What is claimed is:

1. A method for crosstalk channel estimation, comprising:
   loading, on a newly added line K, a combination of K-1 signals sent on lines 1 to K-1,
   obtaining a measured signal-to-noise ratio (SNR) of the line K loaded with the combination of the K-1 signals sent on the lines 1 to K-1, and
   calculating crosstalk channels of the line K according to K-1 coefficients of the K-1 signals sent on the lines 1 to K-1 and the measured SNR;
   wherein the step of loading the combination of the K-1 signals sent on lines 1 to K-1 comprises:
   loading the combination of the K-1 signals sent on lines 1 to K-1 according to a formula:

$$x_K^{(n)}(l) = s_K^{(n)}(l) + \varepsilon \sum_{i=1}^{K-1} z_i^{(n)} s_i^{(n)}(l),$$

wherein $\varepsilon$ indicates a step; $z_i^{(n)}$ indicates a coefficient of line i during SNR measurement n; $s_i^{(n)}(l)$ denotes a signal to be sent on symbol l of line i during SNR measurement n; and $x_K^{(n)}(l)$ denotes a signal actually sent on the line K.

2. The method of claim 1, wherein the step of calculating crosstalk channels of the line K according to K-1 coefficients of the K-1 signals sent on the lines 1 to K-1 and the measured SNR comprises:
   calculating crosstalk channels of the line K according to the $z_i^{(n)}$ and the measured SNR.

3. The method of claim 1, wherein the K-1 coefficients meet following condition:

$$\sum_{i=1}^{K-1} |z_i^{(n)}|^2 = 1.$$

4. The method of claim 1, wherein the $\varepsilon$ is set according to a formula:

$$\varepsilon = \min_i \frac{1}{2} \frac{1}{\sqrt{SNR_K^{(0)}}} \frac{\sigma_K}{\sigma_i},$$

and $\sigma_i^2$ indicates a transmit power of line i, $\sigma_K^2$ indicates a transmit power of the line K and $SNR_K^{(0)}$ indicates a SNR of the line K at a receive end when no signals are loaded.

5. The method of claim 1, wherein the crosstalk channels are normalized by a direct channel of the line K.

6. The method of claim 1, wherein if transmit powers of the lines 1 to K are same, the crosstalk channels are represented by $$\frac{h_{K,i}}{h_{K,K}} = a_i + ja_{K-1+i},$$

wherein i runs from 1 to K-1, and
   wherein $h_{K,i}$ indicates a crosstalk transfer function of line i to line K and $h_{K,K}$ indicates a channel transfer function of the line K;

wherein the $a_i$ are defined with $$\overline{a}_i = \frac{h_{K,i}}{h_{K,K}} \sigma_i,$$

$\sigma_i^2$ indicating a transmit power of line i.

7. The method of claim 1, wherein if transmit powers of lines 1 to K are different, the crosstalk channels are represented by $$\frac{h_{K,i}}{h_{K,K}} = \frac{1}{\sigma_i}(a_i + ja_{K-1+i}),$$

wherein i runs from 1 to K-1, and
   wherein $h_{K,i}$ indicates a crosstalk transfer function of line i to line K and $h_{K,K}$ indicates a channel transfer function of the line K;
   wherein $a_i$ is defined with $$\overline{a}_i = \frac{h_{K,i}}{h_{K,K}} \sigma_i,$$

$\sigma_i^2$ indicating a transmit power of line i.

8. The method of claim 1, wherein a value of the $\varepsilon$ is chosen such that the reduced value of the SNR of the line K after signal loading is not exceed 3.5 dB.

9. The method of claim 1, wherein the step of obtaining the measured SNR of the line K loaded with the combination of the K-1 paths of signals comprises:
   receiving the measured SNR of the line K returned from an opposite device which measures the SNR.

10. The method of claim 9, wherein calculating crosstalk channels of the line K according to K-1 coefficients of the K-1 signals sent on the lines 1 to K-1 and the measured SNR further comprising:
   calculating the crosstalk channels of the line K, by a transceiver device, according to the SNR of the line K returned from the opposite device and the K-1 coefficients.

11. An apparatus, comprising:
   a transceiver configured to:
   load, on a newly added line K, a combination of K-1 signals sent on lines 1 to K-1;
   obtain a measured signal-to-noise ratio (SNR) of the line K loaded with the combination of the K-1 signals sent on the lines 1 to K-1; and
   calculate crosstalk channels of the line K according to K-1 coefficients of the K-1 signals sent on the line 1 to the line K-1 and the measured SNR;
   wherein the transceiver is further configured to load on the line K the combination of K-1 signals sent on lines 1 to K-1 by a formula:

$$x_K^{(n)}(l) = s_K^{(n)}(l) + \varepsilon \sum_{i=1}^{K-1} z_i^{(n)} s_i^{(n)}(l),$$

wherein $\varepsilon$ indicates a step; $z_i^{(n)}$ indicates a coefficient of line i during SNR measurement n; $s_i^{(n)}(l)$ denotes a signal to be sent on symbol l of line i during SNR measurement n; and $x_K^{(n)}(l)$ denotes a signal actually sent on the line K.

12. The apparatus of claim 11, wherein the transceiver is further configured to receive the measured SNR of the line K returned from an opposite device which measures the SNR.

13. The apparatus of claim 12, wherein the transceiver is further configured to calculate crosstalk channels of the line K according to K-1 coefficients of the K-1 signals sent on the lines 1 to K-1 and the measured SNR by:
  calculating the crosstalk channels of the line K, by a transceiver device, according to the SNR of the line K returned from the opposite device and the K-1 coefficients.

14. The apparatus of claim 11, wherein if transmit powers of the lines 1 to K are same, the transceiver calculates the crosstalk channels according to a formula:

$$\frac{h_{K,i}}{h_{K,K}} = a_i + ja_{K-1+i},$$

wherein i runs from 1 to K-1, and
  wherein $h_{K,i}$ indicates a crosstalk transfer function of line i to line K and $h_{K,K}$ indicates a channel transfer function of the line K;
  wherein the $a_i$ are defined with $$\overline{a}_i = \frac{h_{K,i}}{h_{K,K}} \sigma_i,$$

$\sigma_i^2$ indicating a transmit power of line i.

15. The apparatus of claim 11, wherein if transmit powers of lines 1 to K are different, the transceiver calculates the crosstalk channels according to a formula:

$$\frac{h_{K,i}}{h_{K,K}} = \frac{1}{\sigma_i}(a_i + ja_{K-1+i}),$$

wherein i runs from 1 to K-1, and
  wherein $h_{K,i}$ indicates a crosstalk transfer function of line i to line K and $h_{K,K}$ indicates a channel transfer function of the line K;
  wherein $a_i$ is defined with $$\overline{a}_i = \frac{h_{K,i}}{h_{K,K}} \sigma_i,$$

$\sigma_i^2$ indicating a transmit power of line i.

16. A method for channel estimating, comprising:
  receiving, at a transceiver on a newly added_line K, a signal comprising a combination of K-1 signals sent on lines 1 to K-1;
  obtaining, at the transceiver, a signal-to-noise ratio (SNR) of the line K in response to the reception of the signal; and
  calculating, at the transceiver, crosstalk channels of the line K according to K-1 coefficients associated with the K-1 signals sent on the lines 1 to K-1 and the SNR;
  wherein the combination of the K-1 signals sent on lines 1 to K-1 is based on a formula $$x_K^{(n)}(l) = s_K^{(n)}(l) + \varepsilon \sum_{i=1}^{K-1} z_i^{(n)} s_i^{(n)}(l),$$

wherein $\varepsilon$ indicates a step; $z_i^{(n)}$ indicates a coefficient of line i during SNR measurement n; $s_i^{(n)}(l)$ denotes a signal to be sent on symbol l of line i during SNR measurement n; and $x_K^{(n)}(l)$ denotes a signal actually sent on the line K.

17. The method of claim 16, wherein the K-1 coefficients meet following condition:

$$\sum_{i=1}^{K-1} |z_i^{(n)}|^2 = 1.$$

18. The method of claim 16, wherein the $\varepsilon$ is set according to a formula:

$$\varepsilon = \min_i \frac{1}{2} \frac{1}{\sqrt{SNR_K^{(0)}}} \frac{\sigma_K}{\sigma_i}.$$

and $\sigma_i^2$ indicates a transmit power of line i, $\sigma_K^2$ indicates a transmit power of the line K and $SNR_K^{(0)}$ indicates a SNR of the line K at a receive end when no signals are loaded.

19. The method of claim 16, wherein a value of the $\varepsilon$ is chosen such that the reduced value of the SNR of the line K after signal loading is not exceed 3.5 dB.

20. The method of claim 16, wherein the step of calculating, at the transceiver, crosstalk channels of the line K according to K-1 coefficients of the K-1 signals sent on the lines 1 to K-1 and the SNR comprises:
  calculating crosstalk channels of the line K according to the $z_i^{(n)}$ and the SNR.

21. The method of claim 16, wherein if transmit powers of the lines 1 to K are same, the crosstalk channels are represented by $$\frac{h_{K,i}}{h_{K,K}} = a_i + ja_{K-1+i},$$

wherein i runs from 1 to K-1, and
  wherein $h_{K,i}$ indicates a crosstalk transfer function of line i to line K and $h_{K,K}$ indicates a channel transfer function of the line K;
  wherein the $a_i$ are defined with $$\overline{a}_i = \frac{h_{K,i}}{h_{K,K}} \sigma_i,$$

$\sigma_i^2$ indicating a transmit power of line i.

22. The method of claim 16, wherein if transmit powers of lines 1 to K are different, the crosstalk channels are represented by $$\frac{h_{K,i}}{h_{K,K}} = \frac{1}{\sigma_i}(a_i + ja_{K-1+i}),$$

wherein i runs from 1 to K-1, and
    wherein $h_{K,i}$ indicates a crosstalk transfer function of line i to line K and $h_{K,K}$ indicates a channel transfer function of the line K;
    wherein $a_i$ is defined with $$\overline{a}_i = \frac{h_{K,i}}{h_{K,K}} \sigma_i,$$

$\sigma_i^2$ indicating a transmit power of line i.

23. An apparatus comprising a transceiver configured to:
    receive, on line K, a signal comprising a combination of K-1 signals sent on lines 1 to K-1, wherein the line K is a newly added one;
    obtain a signal-to-noise ratio (SNR) of the line K in response to the reception of the signal; and
    calculate crosstalk channels of the line K according to K-1 coefficients associated with the K-1 signals sent on the lines 1 to K-1 and the SNR;
    wherein the combination of the K-1 signals sent on lines 1 to K-1 is based on a formula:

$$x_K^{(n)}(l) = s_K^{(n)}(l) + \varepsilon \sum_{i=1}^{K-1} z_i^{(n)} s_i^{(n)}(l),$$

wherein $\varepsilon$ indicates a step; $z_i^{(n)}$ indicates a coefficient of line i during SNR measurement n; $s_i^{(n)}(l)$ denotes a signal to be sent on symbol l of line i during SNR measurement n; and $x_K^{(n)}(l)$ denotes a signal actually sent on the line K.

24. The apparatus of claim 23, wherein if transmit powers of the lines 1 to K are same, the transceiver calculates the crosstalk channels according to a formula:

$$\frac{h_{K,i}}{h_{K,K}} = a_i + j a_{K-1+i},$$

wherein i runs from 1 to K-1, and
    wherein $h_{K,i}$ indicates a crosstalk transfer function of line i to line K and $h_{K,K}$ indicates a channel transfer function of the line K;
    wherein the $a_i$ are defined with $$\overline{a}_i = \frac{h_{K,i}}{h_{K,K}} \sigma_i,$$

$\sigma_i^2$ indicating a transmit power of line i.

25. The apparatus of claim 23, wherein if transmit powers of lines 1 to K are different, the transceiver calculates the crosstalk channels according to a formula:

$$\frac{h_{K,i}}{h_{K,K}} = \frac{1}{\sigma_i}(a_i + j a_{K-1+i}),$$

wherein i runs from 1 to K-1, and
    wherein $h_{K,i}$ indicates a crosstalk transfer function of line i to line K and $h_{K,K}$ indicates a channel transfer function of the line K;
    wherein $a_i$ is defined with $$\overline{a}_i = \frac{h_{K,i}}{h_{K,K}} \sigma_i,$$

$\sigma_i^2$ indicating a transmit power of line i.

26. The apparatus of claim 23, wherein the transceiver is further configured to send the calculated crosstalk channels of the line K to an opposite device.

* * * * *